(12) United States Patent
Lee

(10) Patent No.: US 7,474,372 B2
(45) Date of Patent: Jan. 6, 2009

(54) LIQUID CRYSTAL DISPLAY HAVING A PROTECTIVE ALIGNMENT FILM AND FABRICATING METHOD THEREOF

(75) Inventor: Yun Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 414 days.

(21) Appl. No.: 10/032,062

(22) Filed: Dec. 31, 2001

(65) Prior Publication Data

US 2002/0135722 A1 Sep. 26, 2002

(30) Foreign Application Priority Data

Mar. 26, 2001 (KR) .................. 10-2001-0015744

(51) Int. Cl.
*G02F 1/1337* (2006.01)
(52) U.S. Cl. .................. 349/125; 349/123; 349/93
(58) Field of Classification Search .................. 349/43, 349/93, 123, 124, 125
See application file for complete search history.

(56) References Cited

U.S. PATENT DOCUMENTS

| | | | | |
|---|---|---|---|---|
| 5,184,236 A * | 2/1993 | Miyashita et al. ............. | 349/99 |
| 6,139,926 A | 10/2000 | Auman et al. | |
| 6,177,970 B1 * | 1/2001 | Kim ............................ | 349/43 |
| 6,215,541 B1 * | 4/2001 | Song et al. .................... | 349/141 |
| 6,271,903 B1 * | 8/2001 | Shin et al. ..................... | 349/110 |
| 6,388,727 B1 * | 5/2002 | Kim et al. ..................... | 349/141 |
| 6,400,435 B2 * | 6/2002 | Son et al. ...................... | 349/141 |
| 6,476,895 B1 * | 11/2002 | Kwak et al. .................. | 349/123 |
| 6,583,841 B2 * | 6/2003 | Youn et al. .................... | 349/141 |
| 6,587,170 B2 * | 7/2003 | Shin et al. ..................... | 349/110 |
| 6,624,864 B1 * | 9/2003 | Kubo et al. ................... | 349/139 |

FOREIGN PATENT DOCUMENTS

| | | |
|---|---|---|
| JP | 61-011724 | 1/1986 |
| JP | 1-169427 | 7/1989 |
| JP | 10-123526 | 5/1998 |
| JP | 10-186351 | 7/1998 |
| JP | 10-325961 | 12/1999 |
| JP | 2000-001613 | 1/2000 |
| JP | 2000-284290 | 10/2000 |

* cited by examiner

*Primary Examiner*—Matthew E Warren
(74) *Attorney, Agent, or Firm*—Morgan Lewis & Bockius LLP

(57) ABSTRACT

A liquid crystal display device having liquid crystal cells arranged in a matrix type, includes a gate line for receiving a scanning signal; a data line for receiving a data signal; a pixel electrode provided at an intersection of the gate line and the data line to drive a liquid crystal cell; a thin film transistor for responding to the scanning signal to switch the data signal into the pixel electrode; and an alignment film formed on at least a portion of the gate line, the data line and the pixel electrode to determine a primary alignment direction of a liquid crystal.

9 Claims, 22 Drawing Sheets

LIQUID CRYSTAL DISPLAY HAVING A PROTECTIVE ALIGNMENT FILM AND FABRICATING METHOD THEREOF

The present invention claims the benefit of Korean Patent Application No. P2001-15744, filed in Korea on Mar. 26, 2001, which is hereby incorporated by reference.

BACKGROUND OF THE INVENTION

1. Field of the Invention

This invention relates to a liquid crystal display, and more particularly to a liquid crystal display and a fabricating method thereof that are capable of reducing the number of masks and the process time of fabrication.

2. Discussion of the Related Art

A liquid crystal display (LCD) of an active matrix driving system may use thin film transistors (TFTs) as switching devices to display a natural moving picture. Since LCDs can be formed into smaller devices than existing Brown tubes, they are used commonly in computer monitors and laptops, in office automation equipment such as copy machines, and in portable equipment such as cellular phones and pagers.

An active matrix LCD displays a picture corresponding to video signals, such as television signals, typically on a pixel (or picture element) matrix having pixels arranged at each intersection of gate lines and data lines. Each pixel includes a liquid crystal cell that controls a transmitted light quantity according to a voltage level of a data signal from a data line. A TFT is installed at an intersection of the gate line and the data line to switch a data signal to the liquid crystal cell in response to a scanning signal (i.e., a gate pulse) from the gate line.

The operation of LCDs can be classified primarily into two modes: a twisted nematic (TN) mode, in which a vertical electric field is applied, and an in-plane switching (IPS) mode, in which a horizontal electric field is applied to have a wide viewing angle, depending on the direction of an electric field driving the liquid crystal.

FIG. 1 shows an electrode arrangement at a TFT substrate of a conventional TN mode LCD device, and FIG. 2 is a section view of the TFT substrate taken along the A-A' line in FIG. 1.

As shown in FIG. 1 and FIG. 2, the LCD device includes a TFT provided at an intersection of a gate line 15 and a data line 13, and a pixel electrode 26 provided in a pixel area near the intersection of the gate line 15 and the data line 13.

The TFT is formed by sequentially depositing a gate electrode 12, a gate insulating film 14, an active layer 16, an ohmic contact layer 18, a source electrode 20 and a drain electrode 22, a protective layer 24, a pixel electrode 26 and an alignment film 28 on a substrate 10. The gate electrode 12 is connected to the gate line 15 and the source electrode 20 is connected to the data line 13.

The TFT applies a data signal from the data line 13 to the pixel electrode 26, and applies a scanning pulse to the gate electrode 12 to drive a liquid crystal cell. The pixel electrode 26 is formed on a portion of the protective layer 24 and on a portion of the drain electrode 22 exposed by a contact hole 30 formed in the protective layer 24. The pixel electrode 26 is formed of a transparent conductive material such as such as indium-tin-oxide (ITO), indium-zinc-oxide (IZO) or indium-tin-zinc-oxide (ITZO). The gate insulating film 14 is formed of an inorganic insulating material, and the protective layer 24 is formed of an organic insulating material.

FIGS. 3A to 3G show steps of a method of fabricating the TFT shown in FIG. 2.

As shown in FIG. 3A, the gate electrode 12 is formed on the transparent substrate 10 by using a sputtering technique to deposit a metal thin film layer on the transparent substrate 10 and patterning it by photolithography and wet etching. The gate electrode 12 is formed of a metal material such as aluminum (Al), copper (Cu) or chrome (Cr), and a $(NH_4)_2S_2O_8$ aqueous solution is used as an etchant for wet etching.

As shown in FIG. 3B, the gate insulating film 14, the active layer 16 and the ohmic contact layer 18 are formed sequentially on the transparent substrate 10 and the gate electrode 12. The gate insulating film 14 is formed by depositing an insulating material such as silicon nitride ($SiN_x$) or silicon oxide ($SiO_x$) onto the transparent substrate 10 by a chemical vapor deposition (CVD) technique. An amorphous silicon (a-Si) layer and an amorphous silicon layer doped with an impurity ($n^+$ a-Si) are sequentially deposited onto the gate insulating film 14. The active layer 16 and the ohmic contact layer 18 are formed by patterning the layers of a-Si and $n^+$ a-Si by photolithography and dry etching.

As shown in FIG. 3C, the source electrode 20 and the drain electrode 22 are formed on the ohmic contact layer 18. The source electrode 20, the drain electrode 22, and the data line 13 are formed by depositing a metal layer on the gate insulating film 14 in such a manner as to cover the ohmic contact layer 18 using a sputtering technique and then patterning it using photolithography and wet etching. The source electrode 20 and the drain electrode 22 are formed of molybdenum (Mo) or a molybdenum alloy such as MoW, MoTa or MoNb, and use a $(NH_4)_2S_2O_8$ aqueous solution as an etchant.

Subsequently, as shown in FIG. 3D, the exposed ohmic contact layer 18 is dry etched by using the source electrode 20 and the drain electrode 22 as a mask to thereby expose the active layer 16 through the ohmic contact layer 18, source electrode 20 and the drain electrode 22.

As shown in FIG. 3E, the protective layer 24 is formed on portions of the gate insulating film 14, the source electrode 20 and the drain electrode 22. The protective layer 24 is formed by depositing an insulating material and then patterning it. The contact hole 30 is formed in the protective layer 24 and exposes a portion of the drain electrode 22. The protective layer 24 is formed of an inorganic insulating material, such as silicon nitride ($SiN_x$) or silicon oxide ($SiO_x$), or an organic insulating material having a small dielectric constant, such as an acrylic organic compound, Teflon, BCB (benzocyclobutene), Cytop or PFCB (perfluorocyclobutane).

As shown in FIG. 3F, the pixel electrode 26 is formed on the protective layer 24 and on the portion of the drain electrode 22 exposed by the contact hole 30. The pixel electrode 26 is formed by depositing a transparent conductive material on the protective layer 24 and then patterning the material. The pixel electrode 26 is formed of ITO, IZO or ITZO. The pixel electrode 26 electrically contacts the drain electrode 22 through the contact hole 30.

As shown in FIG. 3G, the alignment film 28 is formed on the protective layer 24 and the pixel electrode 26. Prior to the formation of the alignment film 28, an annealing is carried out on all of the layers. Furthermore, the TFT is tested by applying an electrical signal to confirm that the TFT is functioning normally in its on and off states of operation.

If the test indicates that the TFT is functionally normally, then a primary alignment film of less than 1000 Å is formed by printing polyimide using a roller and thereafter the normal alignment film 28 is formed by rubbing the surface of the primary alignment film.

FIG. 4 shows an electrode arrangement at a TFT substrate of a conventional IPS mode LCD device, and FIG. 5 is a section view of the TFT substrate taken along the B-B' line in FIG. 4.

As shown in FIG. 4 and FIG. 5, the IPS mode LCD device includes a TFT provided at an intersection of a gate line 35 and a data line 33, and a pixel electrode 46 and a common electrode 44 provided at a pixel area near the intersection of the gate line 35 and the data line The TFT is formed on a transparent substrate 31 and includes a gate electrode 32 connected to the gate line 35, a source electrode 40 connected to the data line 33 and a drain electrode 42 connected to the pixel electrode 46.

The gate electrode 32, the gate line 35 and the common electrode 44 are formed by depositing a metal such as aluminum (Al), copper (Cu) or chrome (Cr), etc. onto the transparent substrate 31 and then patterning it. Herein, the common electrode 44 is patterned in a three-line stripe shape within the pixel cell area.

A gate insulating film 34 made from an inorganic dielectric material such as silicon nitride ($SiN_x$) or silicon oxide ($SiO_x$) is deposited on the surfaces of the substrate 31, the gate electrode 32 and the common electrode 44. An active layer 36 formed of a-Si is deposited on the gate insulating film 34 and an ohmic contact layer 38 formed of a-Si doped with n+ ions is deposited on the active layer 36. The source electrode 40, the drain electrode 42 and the data line 33 formed of a metal are deposited on the ohmic contact layer 38. The source electrode 40 and the drain electrode 42 are patterned in such a manner to be spaced from each other by a predetermined channel width. The pixel electrode 46 is formed by depositing ITO onto a portion of the drain electrode 42 and the gate insulating film 34 and then patterning the deposited material. The pixel electrode 46 is patterned in a two-line stripe shape within the pixel cell area that alternates with the common electrode 44. Subsequently, the ohmic contact layer 38 provided in the space defined by the predetermined channel width between the source electrode 40 and the drain electrode 42 is etched to expose the active layer 36. A protective layer 48, formed of an inorganic insulating material or an organic insulating material having a small dielectric constant, is deposited on the exposed surfaces of the gate insulating film 34, the active layer 36, the source electrode 40, the drain electrode 42, and the pixel electrode 46.

Finally, an alignment film 50 is formed on the protective film 48. Prior to the formation of the alignment film 50, an annealing is carried out on all of the layers. Furthermore, the TFT is tested by applying an electrical signal to confirm that the TFT is functioning normally in its on and off states of operation.

If the test indicates that the TFT is functioning normally, then a primary alignment film of less than 1000 Å is formed by printing polyimide using a roller and thereafter the normal alignment film 50 is formed by rubbing the surface of the primary alignment film.

However, in fabricating the conventional TN or IPS mode LCD device, the number of mask processes, such as the formation of the protective film, becomes excessive. Thus, the long process time required for the fabrication is a disadvantage of the conventional TN or IPS mode LCD device.

SUMMARY OF THE INVELTION

Accordingly, the present invention is directed to a liquid crystal display and a fabricating method thereof that substantially obviate one or more of the problems due to limitations and disadvantages of the prior art.

An object of the present invention is to provide a liquid crystal display and a fabricating method thereof wherein a polyimide resin is coated to have both the functions of a protective layer and an alignment film, thereby simplifying the process of fabricating the liquid crystal device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages and in accordance with the purpose of the present invention, as embodied and broadly described, the liquid crystal display device according to one aspect of the present invention includes a gate line for receiving a scanning signal; a data line for receiving a data signal; a pixel electrode provided at an intersection of the gate line and the data line to drive a liquid crystal cell; a thin film transistor for responding to the scanning signal to switch the data signal into the pixel electrode; and an alignment film formed on at least a portion of the gate line, the data line and the pixel electrode to determine a primary alignment direction of a liquid crystal.

In another aspect, the liquid crystal display device according to the present invention includes a gate line for receiving a scanning signal; a data line for receiving a data signal; a pixel electrode and a common electrode provided at a pixel area near an intersection of the gate line and the data line to drive a liquid crystal cell; a thin film transistor for responding to the scanning signal to switch the data signal into the pixel electrode; and an alignment film entirely coated on a substrate to protect signal wires including the gate line, the data line, the pixel electrode and the common electrode and to determine a primary alignment direction of a liquid crystal.

In yet another aspect, a method of fabricating a liquid crystal display device according to the present invention includes the steps of forming a gate line and a gate electrode of a thin film transistor on a substrate; entirely coating a gate insulating layer; forming a semiconductor layer of the thin film transistor; forming a data line and source and drain electrodes of the thin film transistor; forming a pixel electrode in such a manner as to be in contact with the drain electrode; and forming an alignment film for protecting signal wires including the gate electrode, the data line, the pixel electrode and the thin film transistor and for determining a primary alignment of a liquid crystal.

In yet another aspect, a method of fabricating a liquid crystal display device according to the present invention includes the steps of forming a gate line, a gate electrode of a thin film transistor and a common electrode on a substrate; coating a gate insulating layer; forming a semiconductor layer of the thin film transistor; forming a data line and source and drain electrodes of the thin film transistor; forming a pixel electrode in such a manner to be in contact with the drain electrode; and forming an alignment film for protecting signal wires including the gate electrode, the data line, the pixel electrode, the common electrode and the thin film transistor and for determining a primary alignment of a liquid crystal.

In yet another aspect, a method of fabricating a liquid crystal display device according to the present invention includes the steps of forming a gate line, a gate electrode of a thin film transistor and a common electrode on a substrate; coating a gate insulating layer; forming a semiconductor layer of the thin film transistor; forming a data line and source and drain electrodes; forming a pixel electrode and a common electrode in such a manner to be in contact with the drain electrode; and forming an alignment film for protecting signal wires including the gate electrode, the data line, the pixel electrode, the common electrode and the thin film transistor and for determining a primary alignment of a liquid crystal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
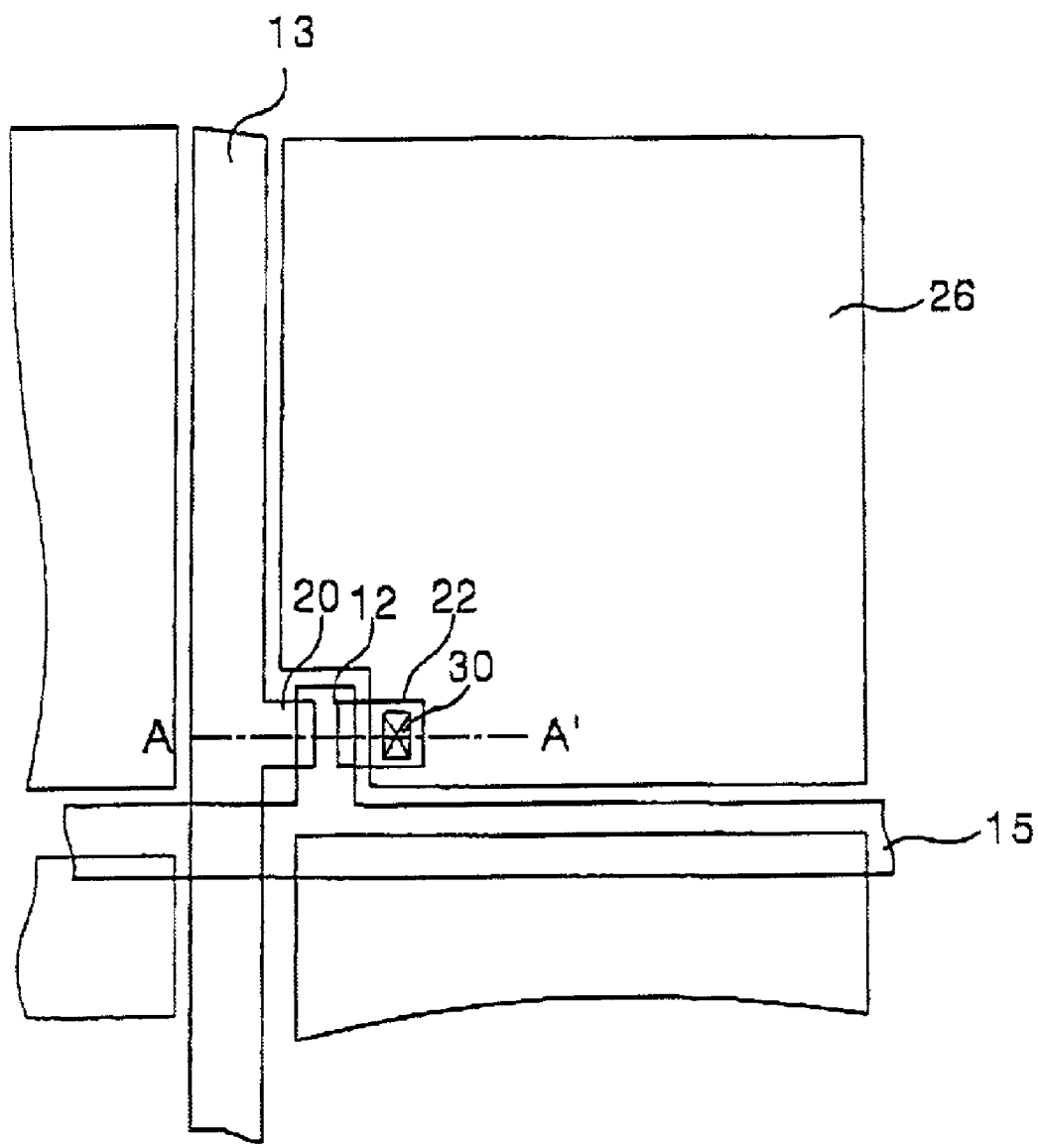
FIG. 1 is a plan view showing an electrode arrangement on a TFT substrate of a conventional TN mode liquid crystal display.
Figure 2:
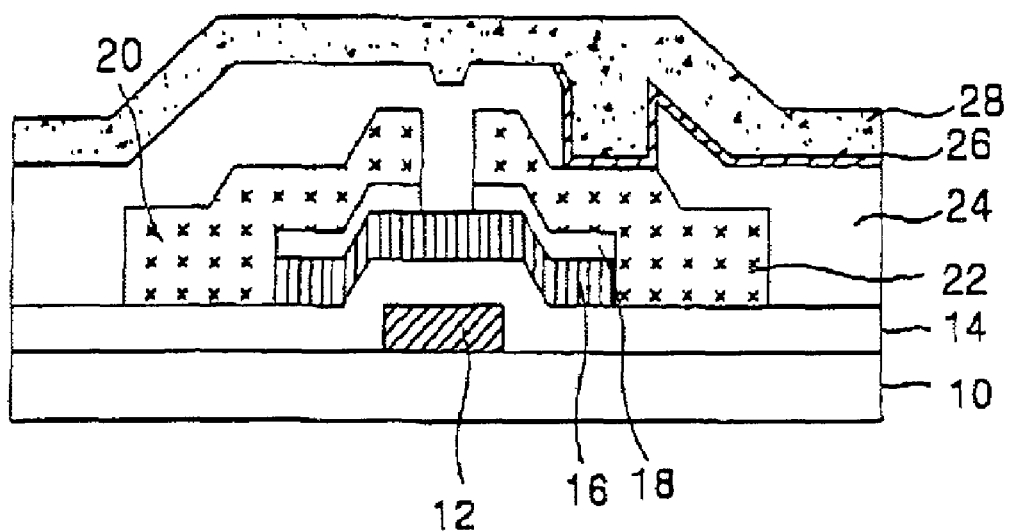
FIG. 2 is a section view of the TFT substrate taken long the A-A' line in FIG. 1.
Figure 3A:
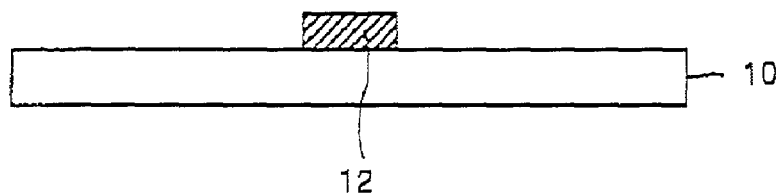
FIG. 3A to FIG. 3G are section views showing steps of a method of fabricating the TFT shown in FIG. 2.
Figure 3B:
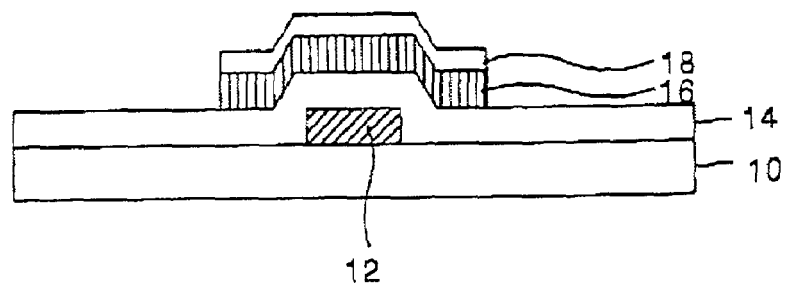
Figure 3C:
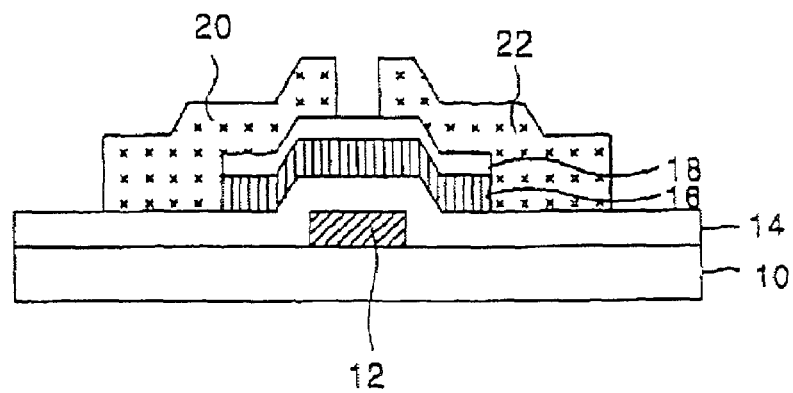
Figure 3D:
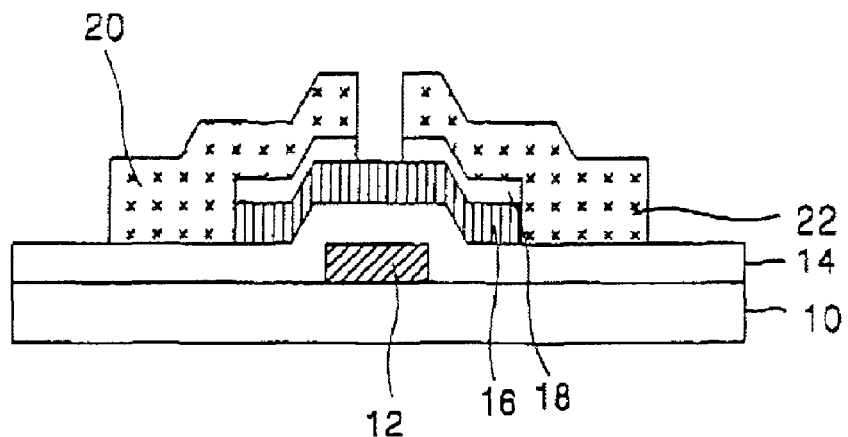
Figure 3E:
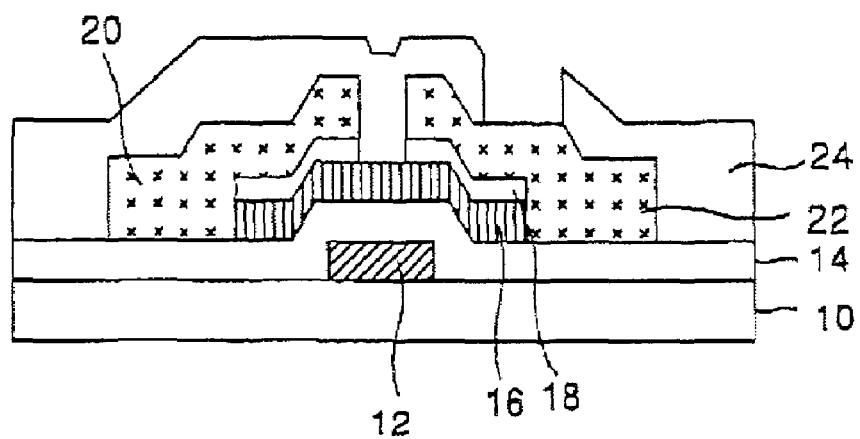
Figure 3F:
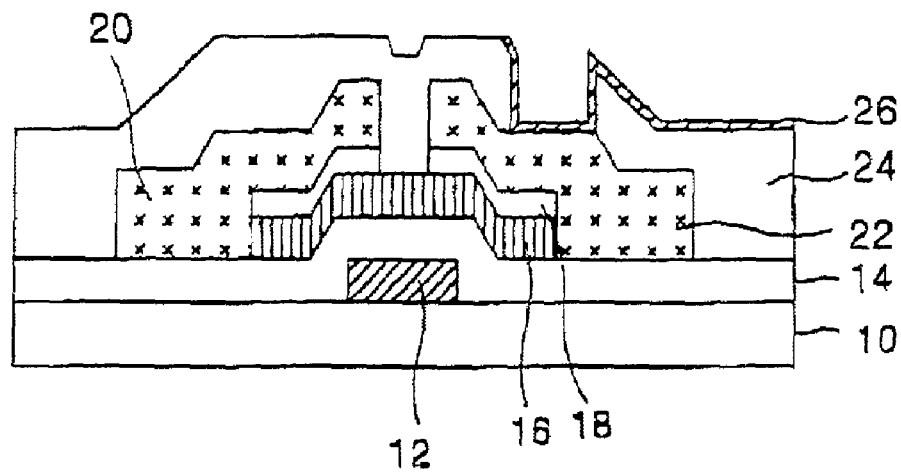
Figure 3G:
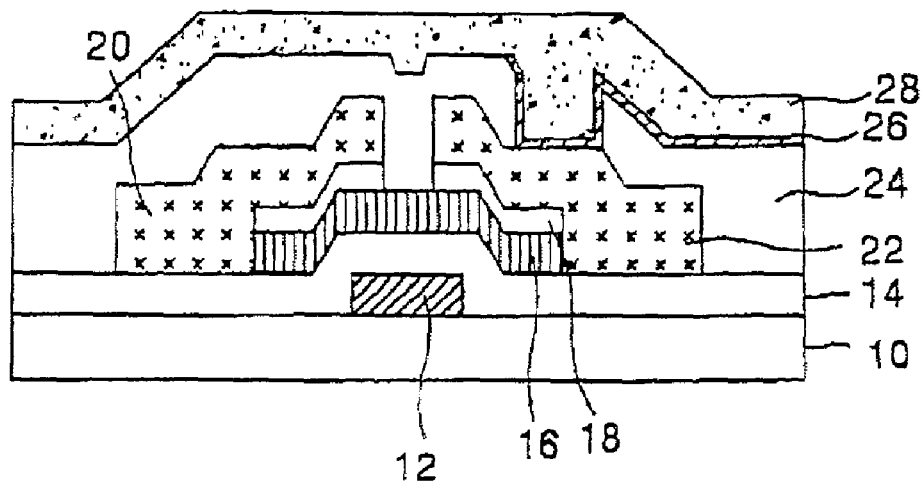
Figure 4:
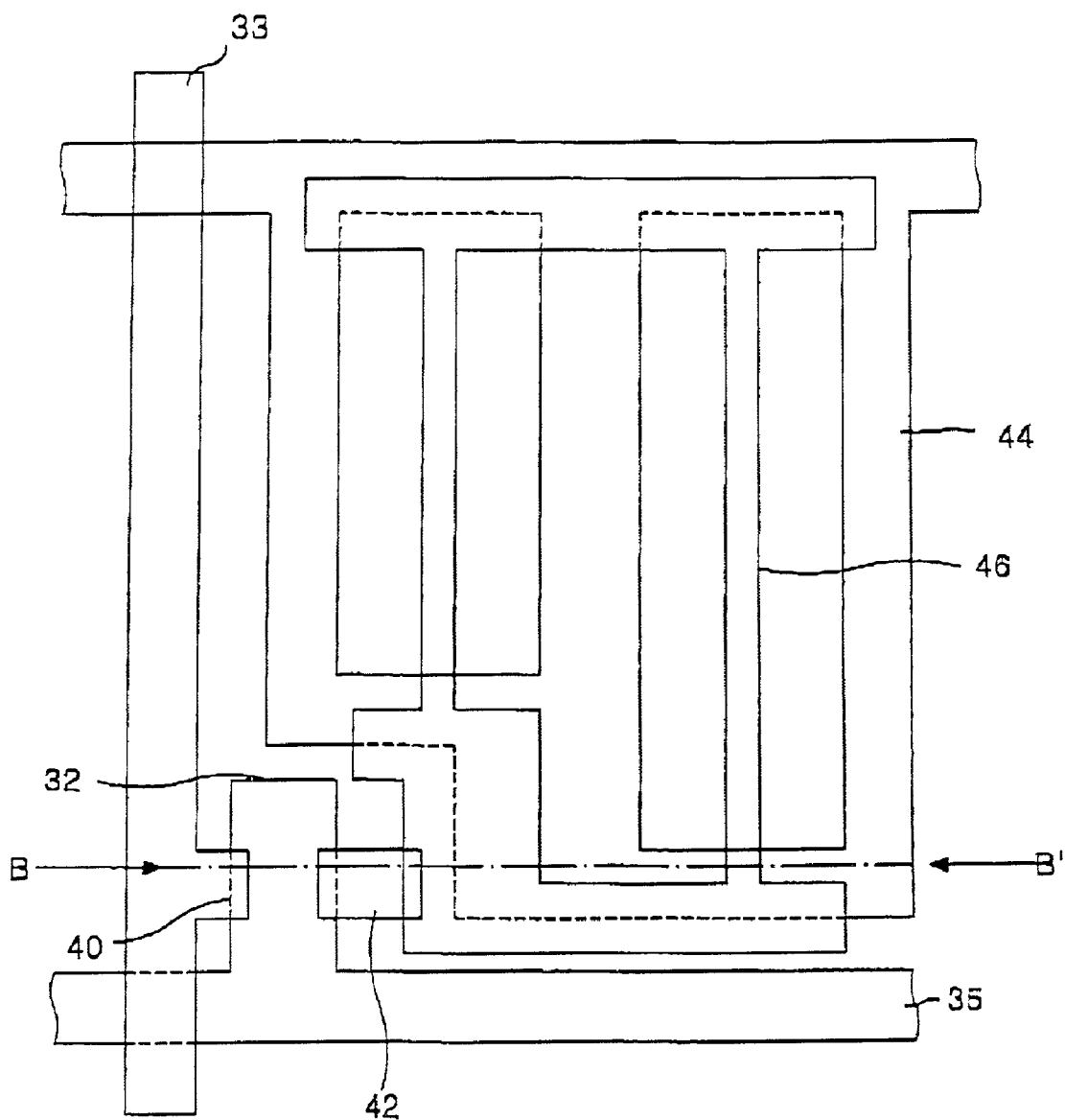
FIG. 4 is a plan view showing an electrode arrangement on a TFT substrate of a conventional IPS mode liquid crystal display.
Figure 5:
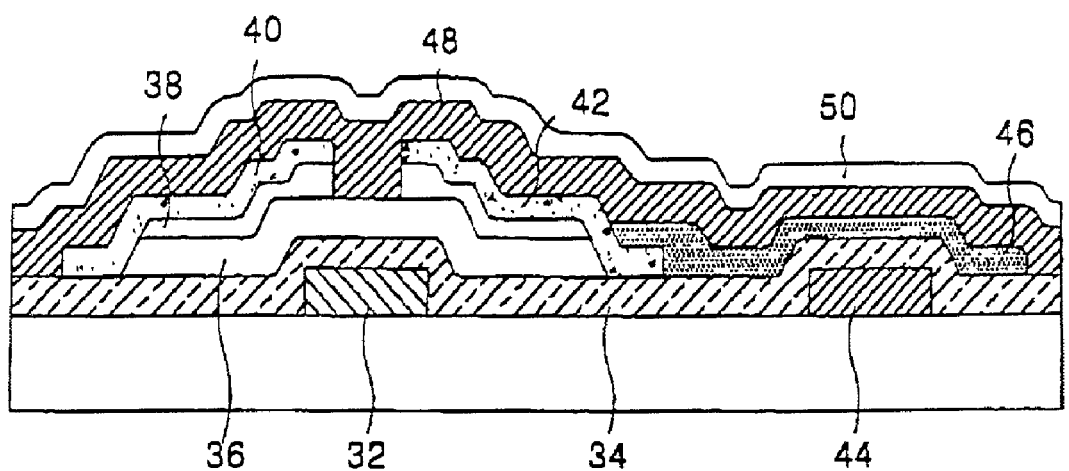
FIG. 5 is a section view of the TFT substrate taken long the B-B' line in FIG. 4.
Figure 6:
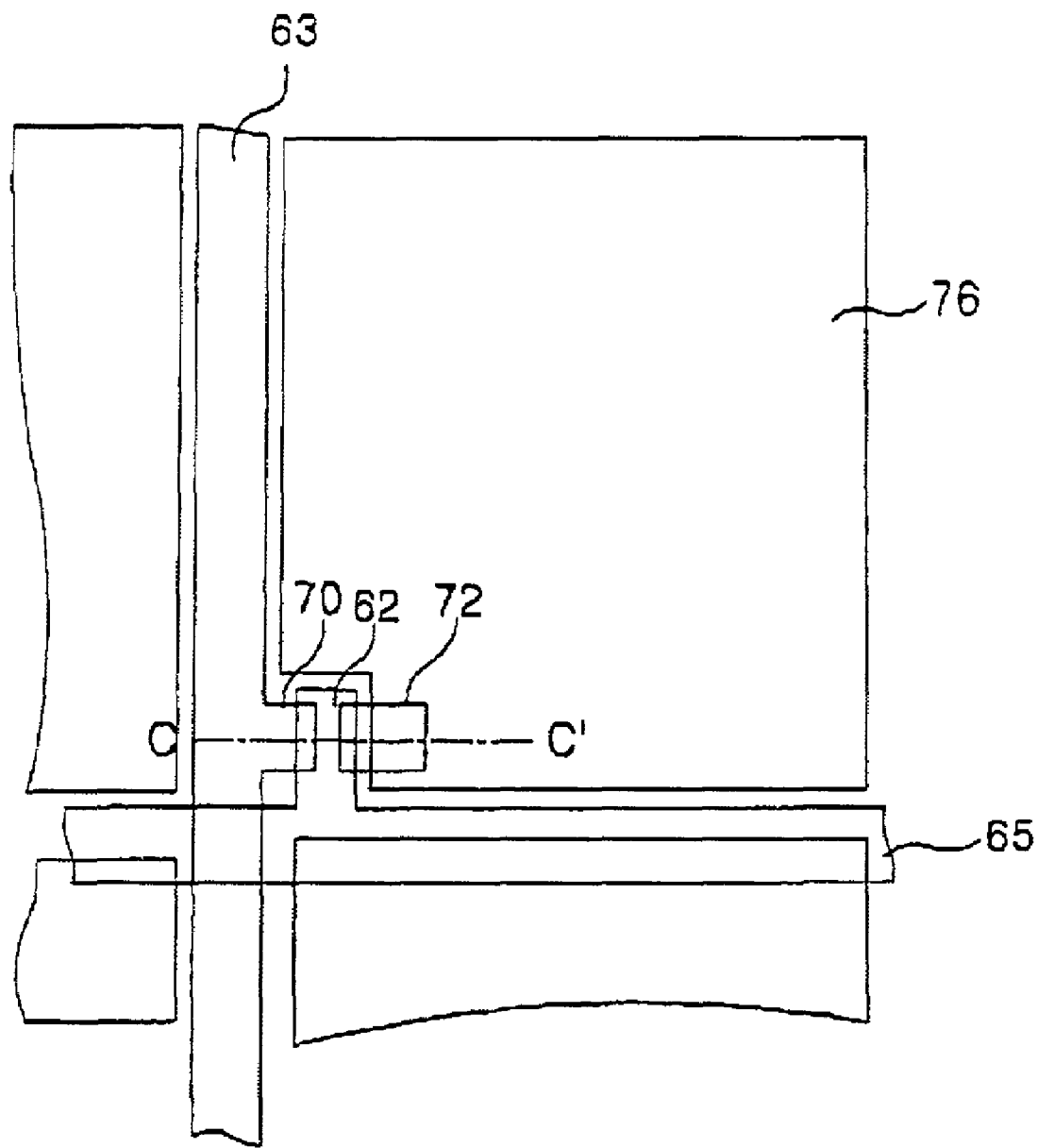
FIG. 6 is a plan view showing an electrode arrangement on a TFT substrate of a TN mode liquid crystal display according to a first embodiment of the present invention.
Figure 7:
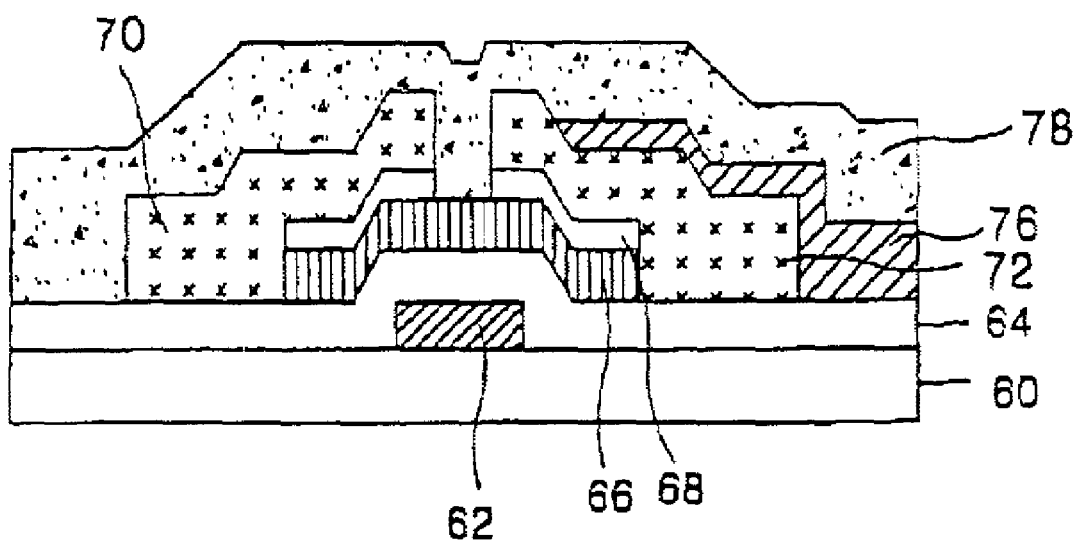
FIG. 7 is a section view of the TFT substrate taken long the C-C' line in FIG. 6.

FIG. 6 shows an electrode arrangement at a TFT substrate of a TN mode LCD device according to a first embodiment of the present invention, and FIG. 7 is a section view of the TFT substrate taken along the C-C' line in FIG. 6.

As shown in FIG. 6 and FIG. 7, the LCD device includes a TFT provided at an intersection between a gate line 65 and a data line 63, and a pixel electrode 76 provided at a pixel area near the intersection of the gate line 65 and the data line 63.

The TFT is formed by sequentially depositing a gate electrode 62, a gate insulating film 64, an active layer 66, an ohmic contact layer 68, a source electrode 70, a drain electrode 72, a pixel electrode 76 and an alignment film 78 on a substrate 60. The gate electrode 62 is connected to the gate line 65 and the source electrode 70 is connected to the data line 63.

The TFT applies a data signal from the data line 63 to the pixel electrode 76, and applies a scanning pulse to the gate electrode 62 to drive a liquid crystal cell. The pixel electrode 76 is formed of a transparent conductive material such as ITO, IZO or ITZO, for example. The gate insulating film 64 is formed of an inorganic insulating material and the alignment film 78 is formed of a polyimide resin.

FIGS. 8A to FIG. 8F show steps of a method of fabricating the TFT shown in FIG. 7.

Figure 8A:
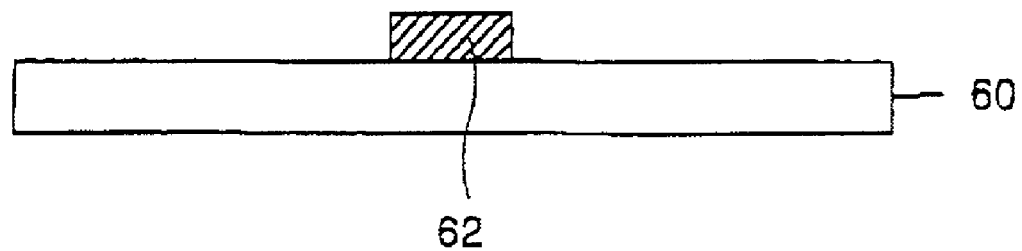
FIG. 8A to FIG. 8F are section views showing steps of a method of fabricating the TFT shown in FIG. 7.

As shown in FIG. 8A, the gate electrode 62 is formed on the transparent substrate 60 by using a sputtering technique to deposit a metal thin film layer on the transparent substrate 60 and patterning it by photolithography and wet etching. The gate electrode 62 is formed of a metal material such as aluminum (Al), copper (Cu) or chrome (Cr), for example, and a $(NH_4)_2S_2O_8$ aqueous solution is used as an etchant for wet etching.

Figure 8B:
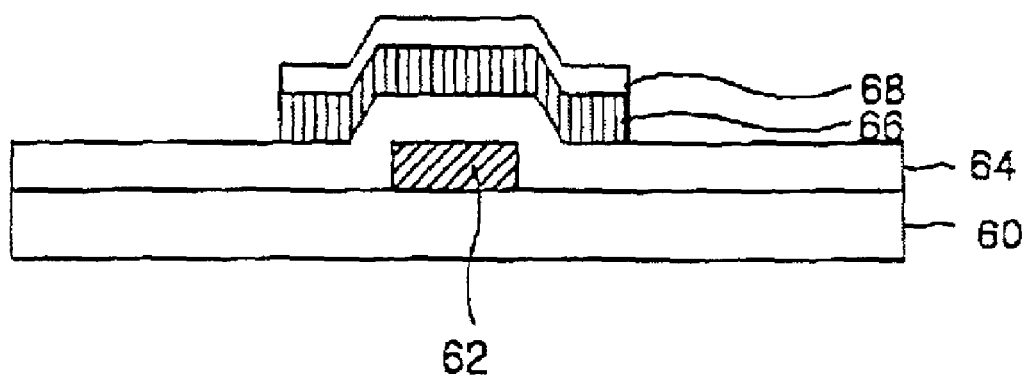

As shown in FIG. 8B, the gate insulating film 64, the active layer 66 and the ohmic contact layer 68 are formed sequentially on the transparent substrate 60 and the gate electrode 62. The gate insulating film 64 is formed by depositing an insulating material such as silicon nitride ($SiN_x$) or silicon oxide ($SiO_x$), for example, onto the transparent substrate 60. An amorphous silicon (a-Si) layer and an amorphous silicon layer doped with an impurity ($n^+$ a-Si) are sequentially deposited onto the gate insulating film 64 by a CVD technique, for example. The active layer 66 and the ohmic contact layer 68 are formed by patterning the layers of a-Si and $n^+$ a-Si by photolithography and then dry etching.

Figure 8C:
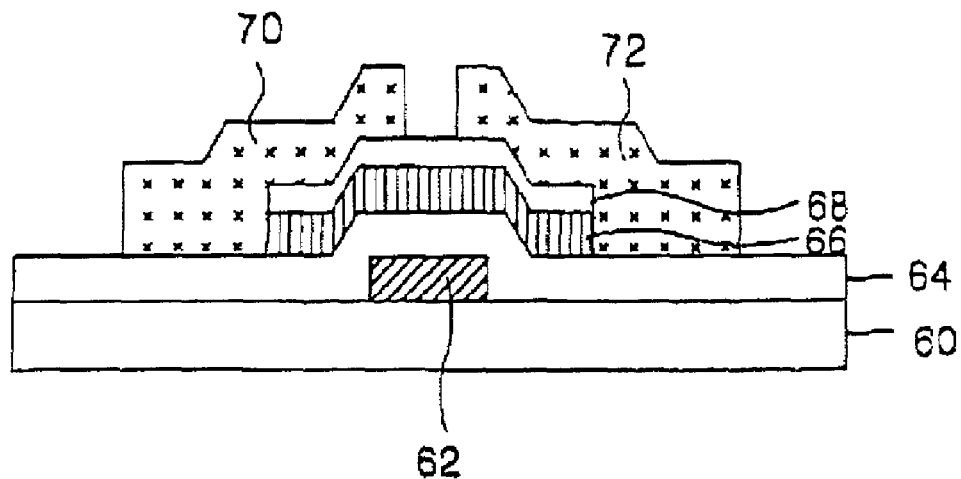

As shown in FIG. 8C, the source electrode 70 and the drain electrode 72 are formed on the ohmic contact layer 68. The source electrode 70, the drain electrode 72 and the data line 63 are formed by depositing a metal layer on the gate insulating film 64 in such a manner as to cover the ohmic contact layer 68 using a sputtering technique and then patterning it using photolithography and then wet etching. The source electrode 70 and the drain electrode 72 may be formed of molybdenum (Mo) or a molybdenum alloy such as MoW, MoTa or MoNb, and use a $(NH_4)_2S_2O_8$ aqueous solution as an etchant.

Figure 8D:
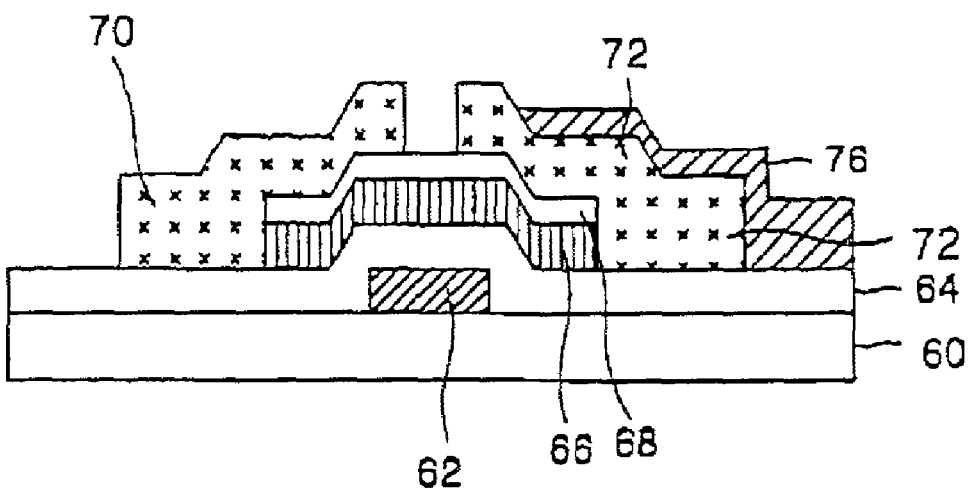

As shown in FIG. 8D, the pixel electrode 76 is formed by depositing a transparent conductive material such as ITO, IZO or ITZO, for example, onto a portion of the gate insulating film 64 and the drain electrode 72.

Figure 8E:
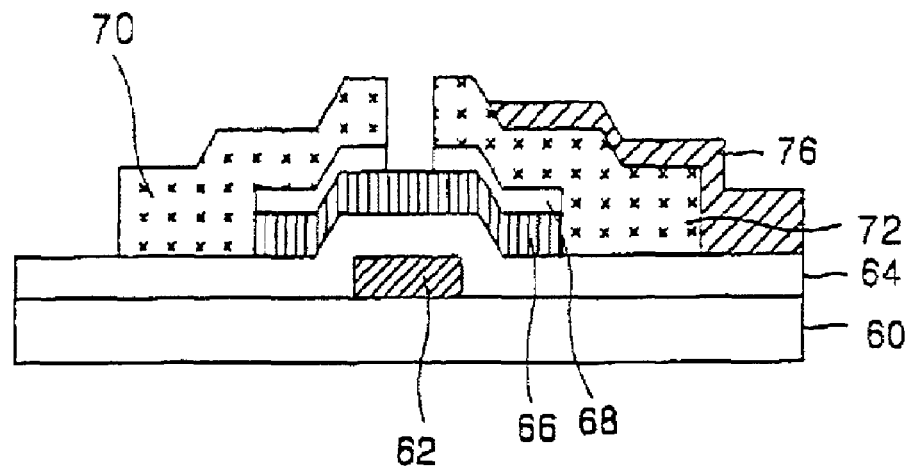

As shown in FIG. 8E, the exposed ohmic contact layer 68 is dry etched by using the source electrode 70 and the drain electrode 72 as a mask to thereby expose the active layer 66 through the ohmic contact layer 68, the source electrode 70 and the drain electrode 72.

Figure 8F:
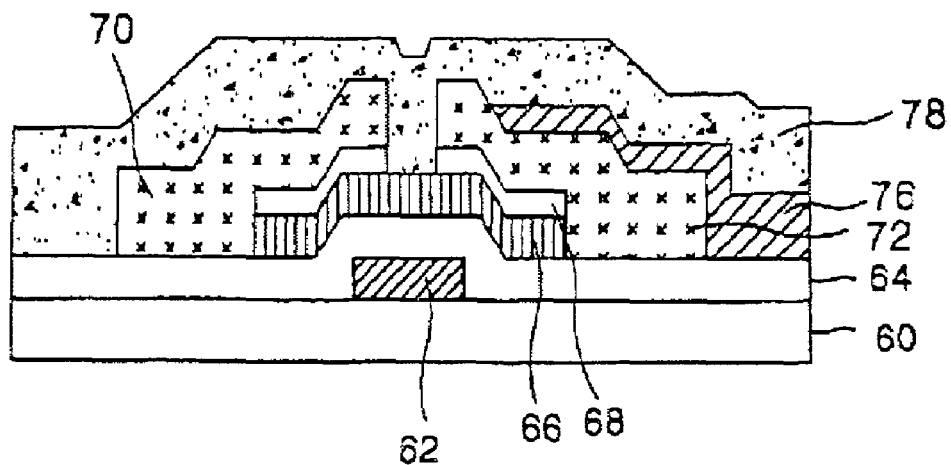

As shown in FIG. 8F, the alignment film 78 is formed on portions of the gate insulating film 64, the active layer 66, the source electrode 70, the drain electrode 72 and the pixel electrode 76. Prior to the formation of the alignment film 78, an annealing is carried out on all of the layers. Furthermore, the TFT is tested by applying an electrical signal to confirm that the TFT is functioning normally in its on and off states of operation.

If the test indicates that the TFT is functioning normally, then a primary alignment film of less than 1000 Å is coated by printing a polyimide resin serving as both the protective layer 24 and the alignment film 28 in the prior art using a roller and thereafter the alignment film 78 is formed by rubbing the surface of the primary alignment film.

Figure 9:
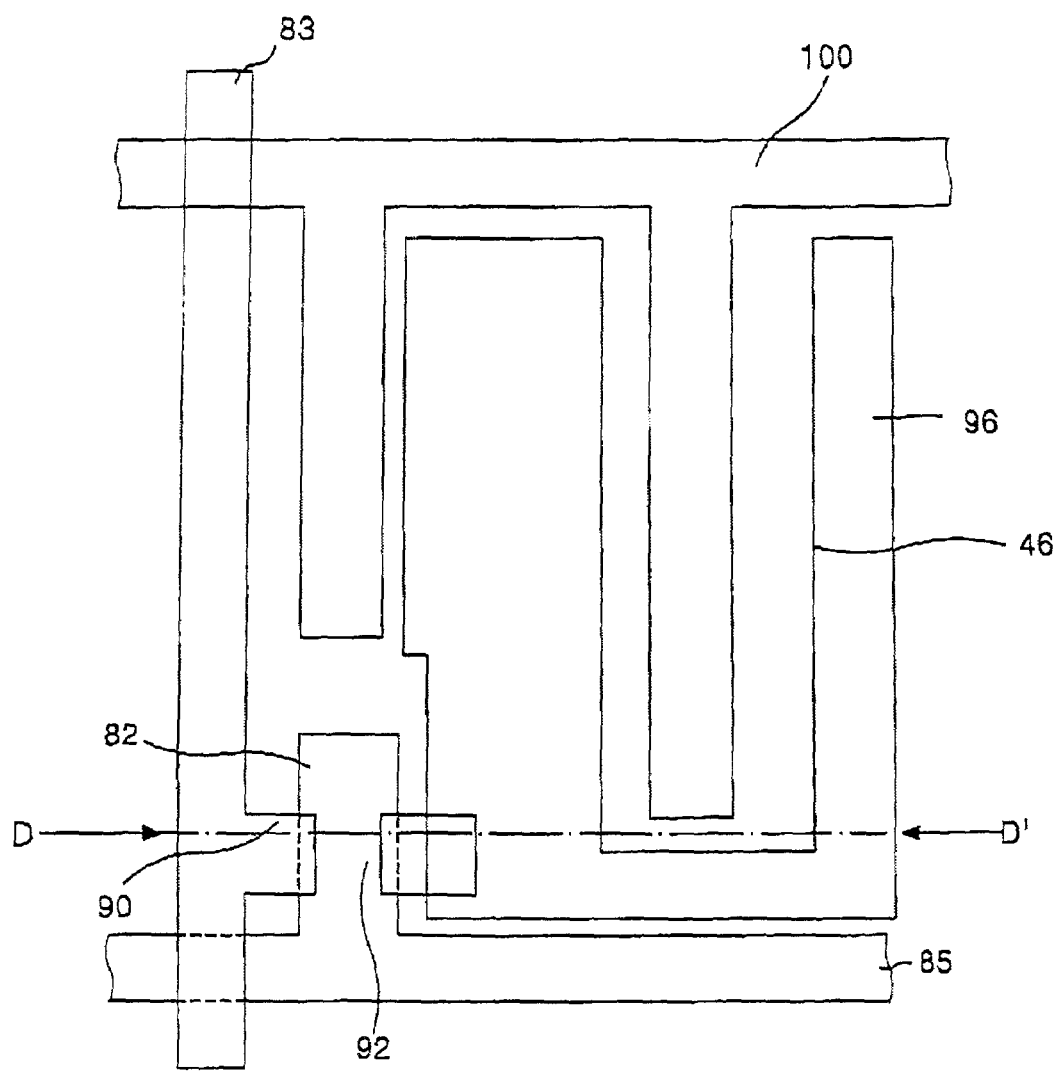
FIG. 9 is a plan view showing an electrode arrangement on a TFT substrate of an IPS mode liquid crystal display according to a second embodiment of the present invention.
Figure 10:
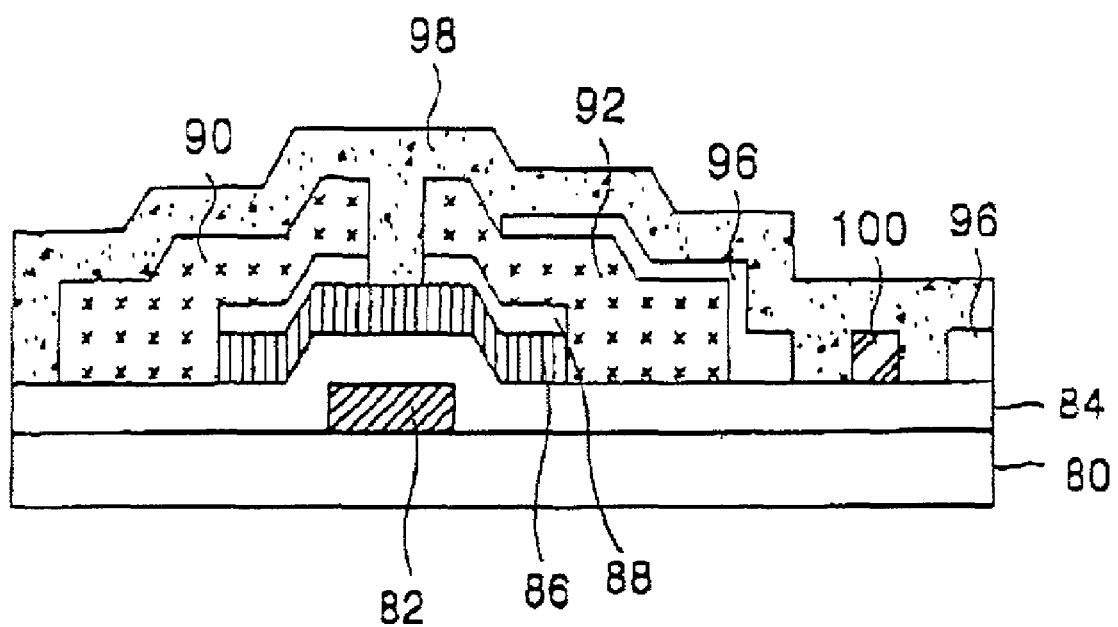
FIG. 10 is a section view of the TFT substrate taken along the D-D' line in FIG. 9.

FIG. 9 shows an electrode arrangement at a TFT substrate of an IPS mode LCD device according to a second embodiment of the present invention, and FIG. 10 is a section view of the TFT substrate taken along the D-D' line in FIG. 9.

As shown in FIG. 9 and FIG. 10, the IPS mode LCD device includes a TFT provided near an intersection of a gate line 85 and a data line 83. Furthermore, a pixel electrode 96 and a common electrode 100 are provided in a pixel area also near the intersection of the gate line 85 and the data line 83.

The TFT is formed on a transparent substrate 80 and includes a gate electrode 82 connected to the gate line 85, a source electrode 90 connected to the data line 83 and a drain electrode 92 connected to the pixel electrode 96.

The gate electrode 82 is formed by depositing a metal such as aluminum (Al), copper (Cu) or chrome (Cr), for example, onto the transparent substrate 80 and then patterning the metal. A gate insulating film 84 formed of an inorganic dielectric material such as silicon nitride ($SiN_x$) or silicon oxide ($SiO_x$) for example, is deposited onto the transparent substrate 80 and the gate electrode 82. An active layer 86 formed of a-Si and an ohmic contact layer 88 formed of a-Si doped with $n^+$ ions are sequentially deposited on the gate insulating film 84. The source electrode 90, the drain electrode 92 and the data line 83 made from a metal are provided on the ohmic contact layer 88. The source electrode 90 and the drain electrode 92 are patterned in such a manner to be spaced from each other by a predetermined channel width. The pixel electrode 96 is formed by depositing ITO onto a portion of the drain electrode 92 and the gate insulating film 94 and then patterning the deposited material. The common electrode 100 is patterned in a stripe shape within the pixel cell area. In this case, the pixel electrode 96 is connected to the drain electrode 92 and is patterned in a stripe shape within the pixel cell area in a manner that alternates with the common electrode 100.

FIGS. 11A to 11F show steps of a method of fabricating the TFT shown in FIG. 10.

Figure 11A:
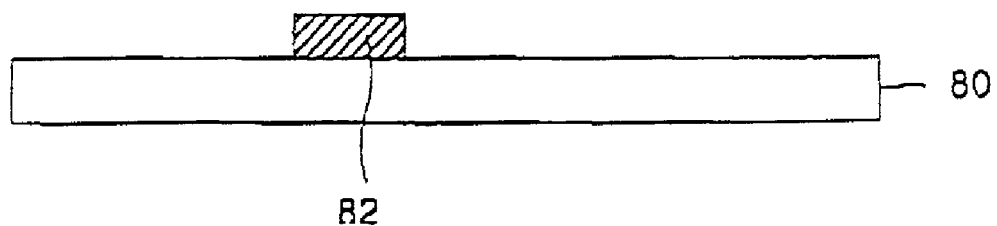
FIG. 11A to FIG. 11F are section views showing steps of a method of fabricating the TFT shown in FIG. 10.

As shown in FIG. 11A, the gate electrode 82 is formed on the transparent substrate 80 by using a sputtering technique to deposit a metal thin film on the transparent substrate 80 and patterning the metal by photolithography and then wet etching. The gate electrode 82 is formed of a metal material such as aluminum (Al), copper (Cu) or chrome (Cr), and a $(NH_4)_2S_2O_8$ aqueous solution is used as an etchant for wet etching.

Figure 11B:
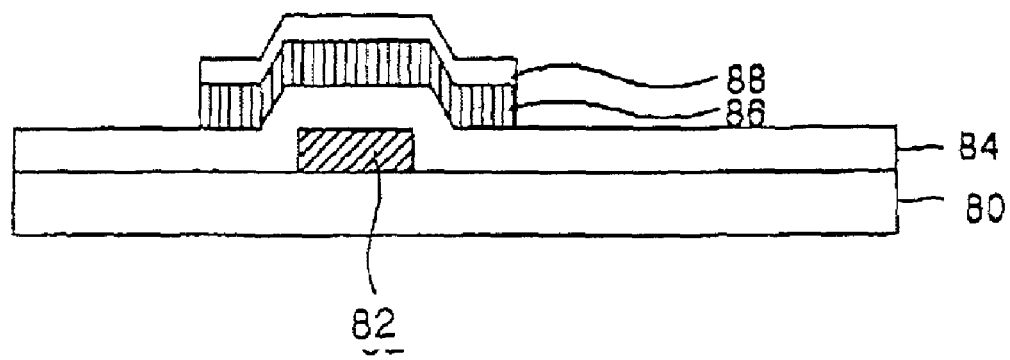

As shown in FIG. 11B, the gate insulating film 84, the active layer 86 and the ohmic contact layer 88 are formed sequentially on the transparent substrate 80 and the gate electrode 82. The gate insulating film 84 is formed by depositing an insulating material such as silicon nitride $(SiN_x)$ or silicon oxide $(SiO_x)$ onto the transparent substrate 80. An amorphous silicon (a-Si) layer and an amorphous silicon layer doped with an impurity ($n^+$ a-Si) are sequentially deposited onto the gate insulating film 84 by a CVD technique. The active layer 86 and the ohmic contact layer 88 are formed by patterning the layers of a-Si and $n^+$ a-Si using photolithography and then dry etching.

Figure 11C:
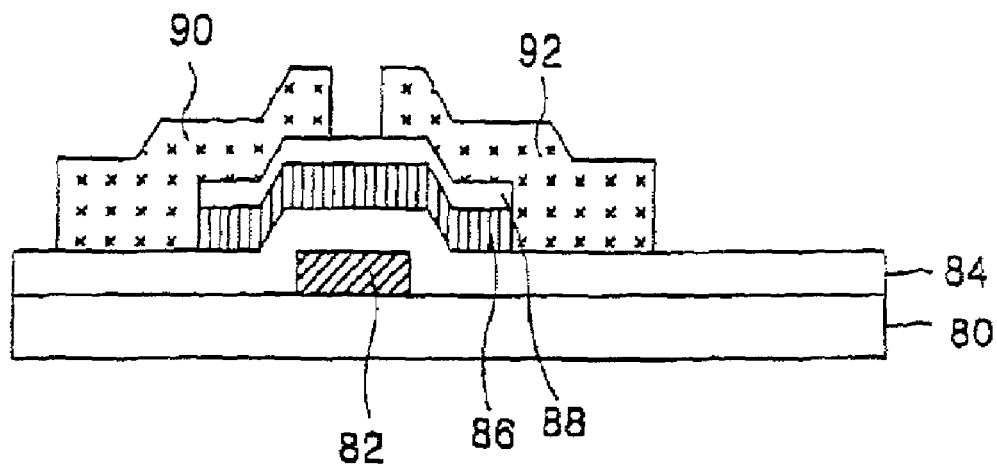

As shown in FIG. 11C, the source electrode 90 and the drain electrode 92 are formed on the ohmic contact layer 88. The source electrode 90, the drain electrode 92 and the data line 83 are formed by depositing a metal layer on the gate insulating film 84 in such a manner as to cover the ohmic contact layer 88 using a sputtering technique and then patterning it using photolithography and then wet etching. The source electrode 90 and the drain electrode 92 may be formed of molybdenum (Mo) or a molybdenum alloy such as MoW, MoTa or MoNb, for example, and use a $(NH_4)_2S_2O_8$ aqueous solution as an etchant.

Figure 11D:
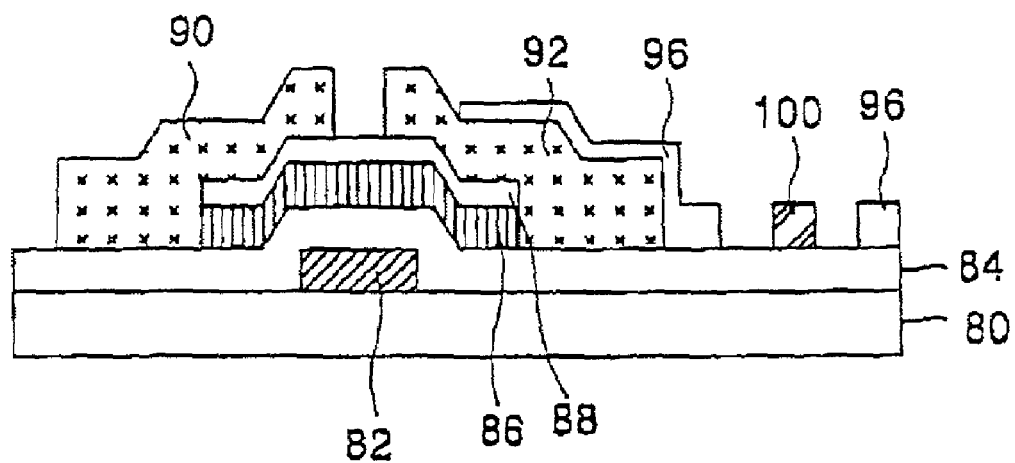

As shown in FIG. 11D, the pixel electrode 96 and the common electrode 100 are formed on the gate insulating film 84 and the drain electrode 92. The pixel electrode 96 and the common electrode 100 are formed of a transparent conductive material such as ITO, IZO or ITZO, for example. The common electrode 100 is preferably spaced at a constant distance from the pixel electrode 96.

Figure 11E:
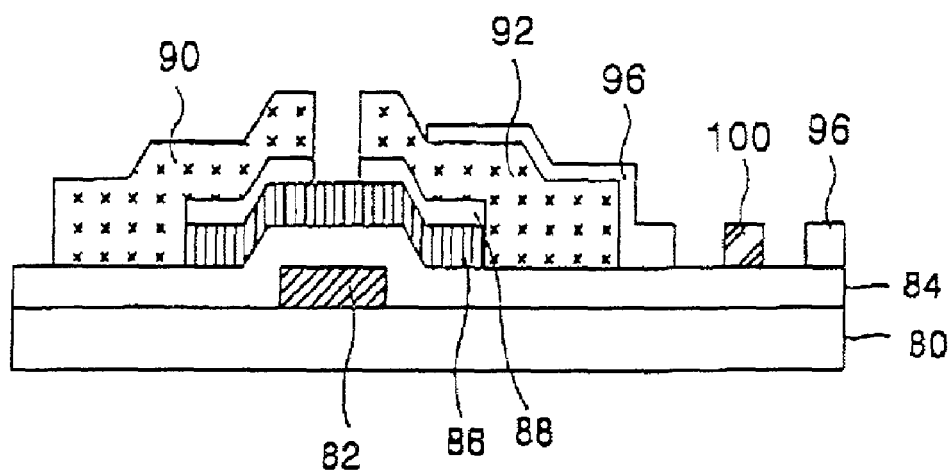

As shown in FIG. 11E, the exposed ohmic contact layer 88 is dry etched by using the source electrode 90 and the drain electrode 92 as a mask to thereby expose the active layer 86 through the source electrode 90 and the drain electrode 92.

Figure 11F:
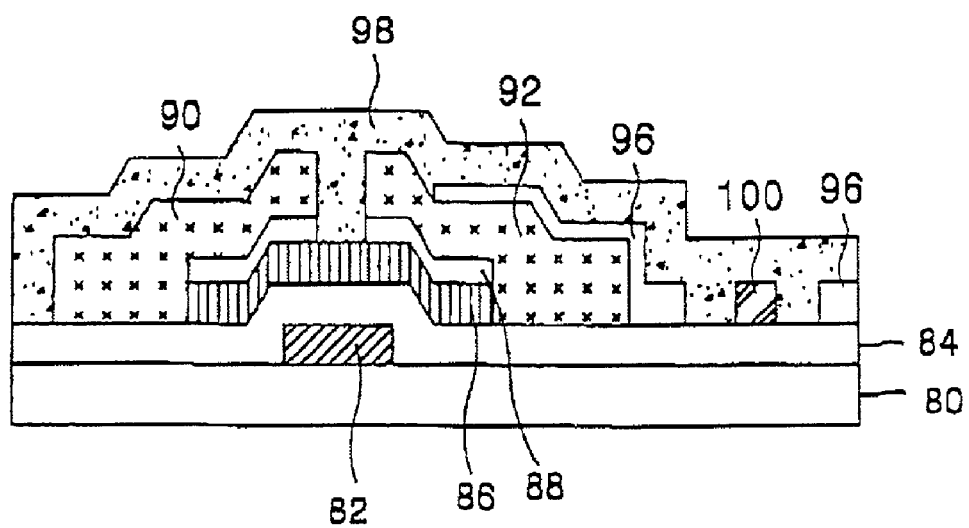

As shown in FIG. 11F, the alignment film 98 is deposited on the exposed surfaces of the gate insulating film 84, the active layer 86, the source electrode 90, the drain electrode 92, the pixel electrode 96 and the common electrode 100. Prior to said formation of the alignment film 98, an annealing is carried out on all of the layers.

Furthermore, the TFT is tested by applying an electrical signal to confirm that the TFT is functioning normally in its on and off states of operation.

If the test indicates that the TFT is functioning normally, then a primary alignment film of less than 1000 Å is coated by printing a polyimide resin serving as both the protective layer 48 and the alignment film 50 in the prior art using a roller and thereafter the alignment film 98 is formed by rubbing the surface of the primary alignment film.

Figure 12:
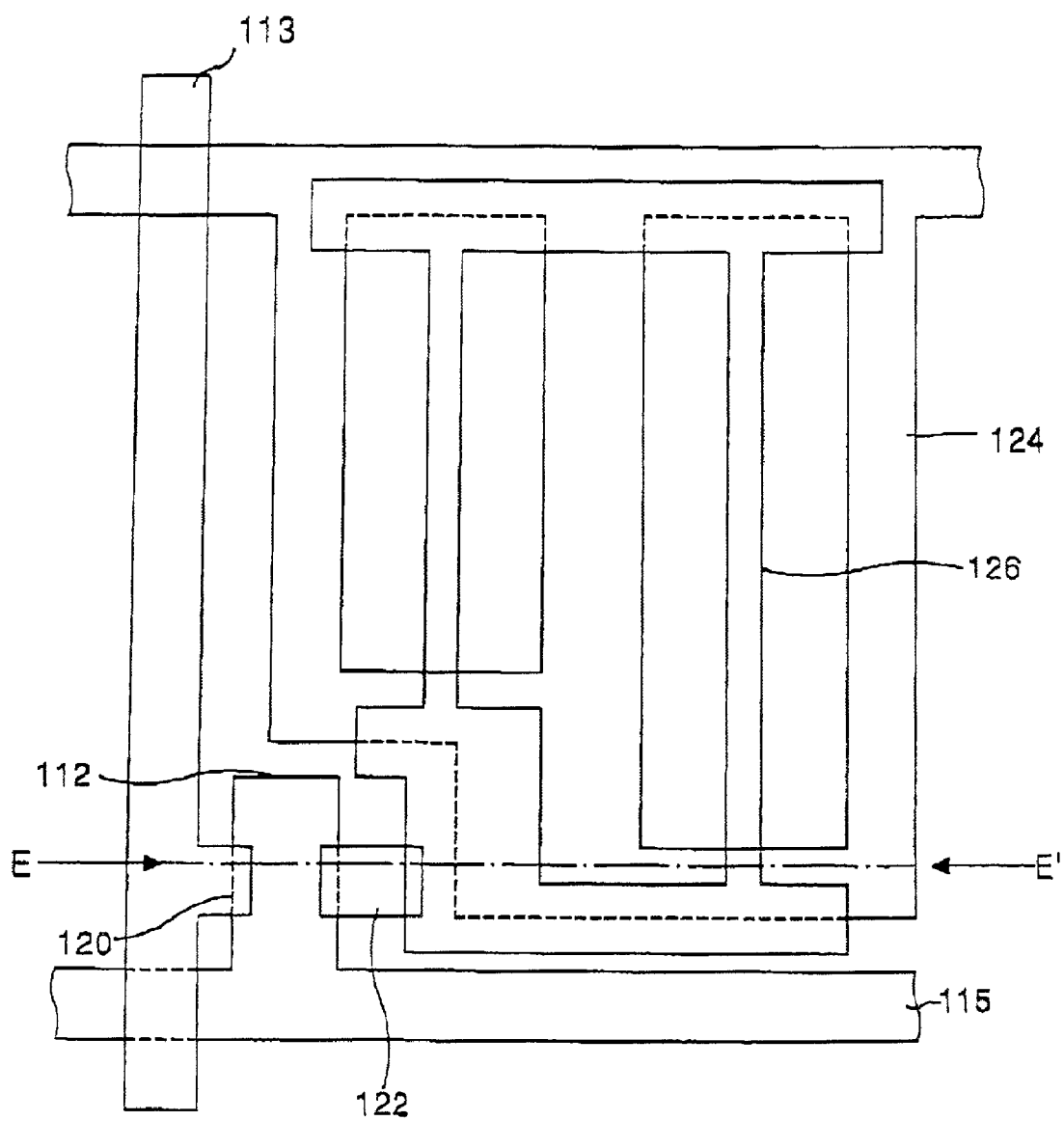
FIG. 12 is a plan view showing an electrode arrangement on a TFT substrate of a IPS mode liquid crystal display according to a third embodiment of the present invention.
Figure 13:
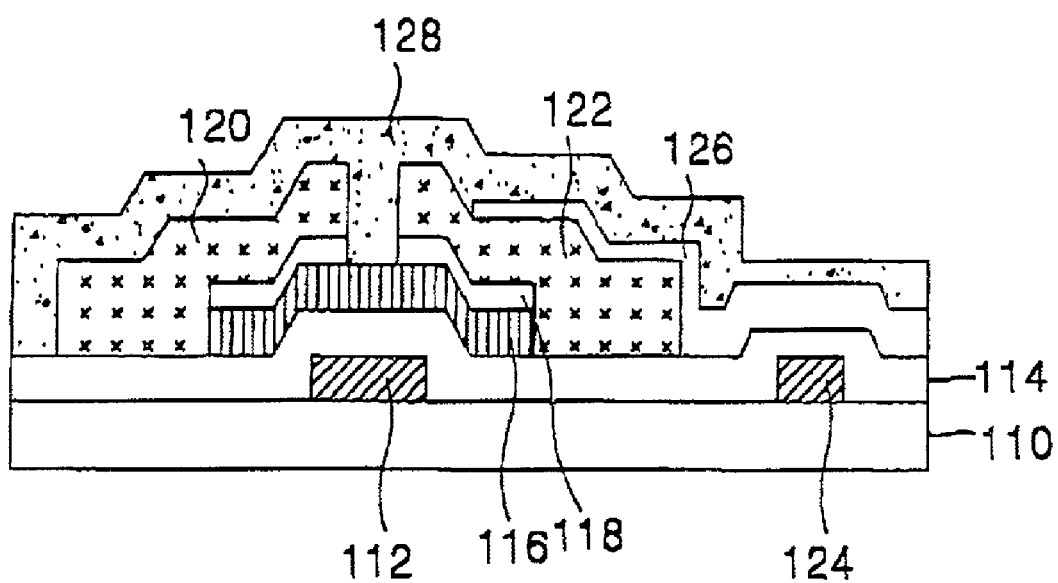
FIG. 13 is a section view of the TFT substrate taken long the E-E' line in FIG. 12.

FIG. 12 shows an electrode arrangement at a TFT substrate of an IPS mode LCD device according to a third embodiment of the present invention, and FIG. 13 is a section view of the TFT substrate taken along the E-E' line in FIG. 12.

As shown in FIG. 12 and FIG. 13, the IPS mode LCD device includes a TFT provided near an intersection of a gate line 115 and a data line 113. Furthermore, a pixel electrode 126 and a common electrode 124 are provided in a pixel area also near the intersection of the gate line 115 and the data line 113.

The ITT is formed on a transparent substrate 110 and includes a gate electrode 112 connected to the gate line 115, a source electrode 120 connected to the data line 113 and a drain electrode 122 connected to the pixel electrode 126.

The gate electrode 112, the gate line 115 and the common electrode 124 are formed by depositing a metal such as aluminum (Al), copper (Cu) or chrome (Cr), for example, onto the transparent substrate 110 and then patterning it. The common electrode 124 is preferably patterned in a three-line stripe shape within the pixel cell area.

A gate insulating film 114 formed of an inorganic dielectric material such as silicon nitride $(SiN_x)$ or silicon oxide $(SiO_x)$, for example, is deposited onto the transparent substrate 110, the gate electrode 112 and the common electrode 124. An active layer 116 formed of a-Si and an ohmic contact layer 118 formed of a-Si doped with $n^+$ ions are sequentially deposited on the gate insulating film 114. The source electrode 120, the drain electrode 122 and the data line 113, each formed of a metal, are provided on the ohmic contact layer 118. The source electrode 120 and the drain electrode 122 are patterned in such a manner as to be spaced from each other by a predetermined channel width. The pixel electrode 126 is formed by depositing ITO onto the drain electrode 122 and the gate insulating film 114 and then patterning it. In this case, the pixel electrode 126 is connected to the drain electrode 122 and is preferably patterned in a two-line stripe shape within the pixel cell area in such a manner as to alternate with the common electrode 124. Subsequently, the ohmic contact layer 118 provided between the source electrode 120 and the drain electrode 122 is etched to expose the active layer 116. The alignment film 128 is formed on exposed portions of the substrate 110, the active layer 116, the ohmic contact layer 118, the source electrode 120, the drain electrode 122 and the pixel electrode 126.

FIGS. 14A to 14F show steps of a method of fabricating the TFT shown in FIG. 13.

Figure 14A:
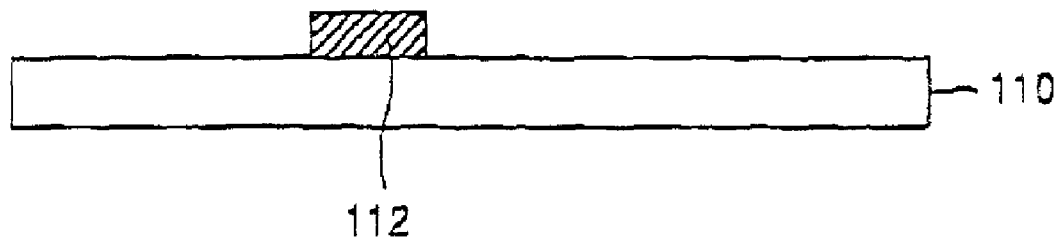
FIG. 14A to FIG. 14F are section views showing steps of a method of fabricating the TFT shown in FIG. 13.
Figure 14B:
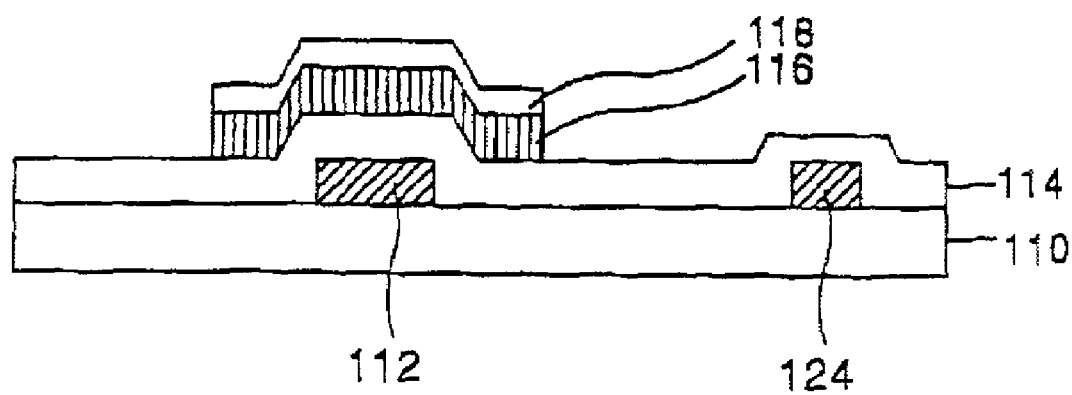

As shown in FIGS. 14A and 14B, the gate electrode 112 and the common electrode 124 are formed on the transparent substrate 110 using a sputtering technique to deposit a metal thin film on the transparent substrate 110 then patterning it by the photolithography and then wet etching. The gate electrode 112 and the common electrode 124 are formed of a metal material such as aluminum (Al), copper (Cu) or chrome (Cr), for example, and a $(NH_4)_2S_2O_8$ aqueous solution is used as an etchant for wet etching. The common electrode 124 may alternatively be formed of an ITO film so as to improve an aperture ratio.

As shown in FIG. 14B, the gate insulating film 114, the active layer 116 and the ohmic contact layer 118 are formed sequentially on the transparent substrate 110, the gate electrode 112 and the common electrode 124. The gate insulating film 114 is formed by depositing an insulating material such as silicon nitride $(SiN_x)$ or silicon oxide $(SiO_x)$, for example, onto the transparent substrate 110. An amorphous silicon (a-Si) layer and an amorphous silicon layer doped with an impurity ($n^+$ a-Si) are sequentially deposited onto the gate insulating film 114 by a CVD technique. The active layer 116 and the ohmic contact layer 118 are formed by patterning the layers of a-Si and $n^+$ a-Si by photolithography and then dry etching.

Figure 14C:
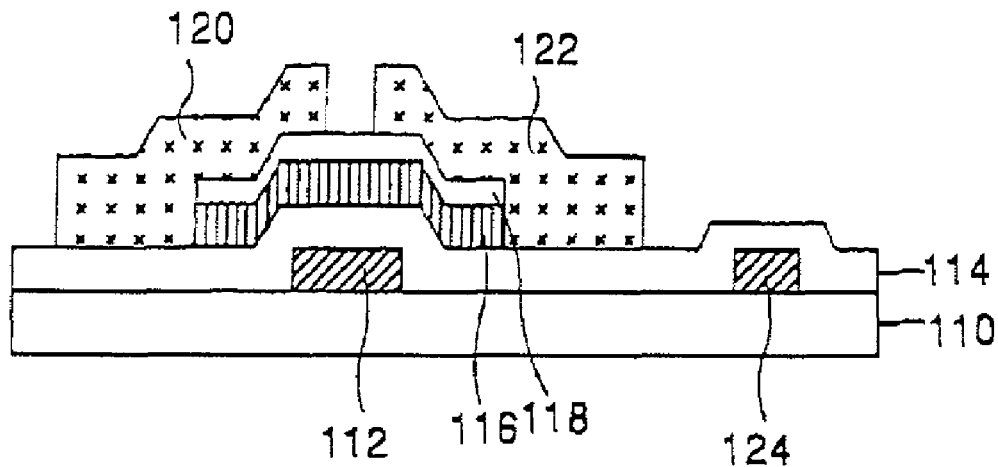

As shown in FIG. 14C, the source electrode 120 and the drain electrode 122 are formed on the ohmic contact layer 118. The source electrode 120, the drain electrode 122 and the data line 113 are formed by depositing a metal layer on the gate insulating film 114 in such a manner as to cover the ohmic contact layer 118 using a sputtering technique and then patterning it by the photolithography and then wet etching. The source electrode 120 and the drain electrode 122 may be formed of molybdenum (Mo) or a molybdenum alloy such as MoW, MoTa or MoNb, for example, and use a $(NH_4)_2S_2O_8$ aqueous solution as an etchant.

Figure 14D:
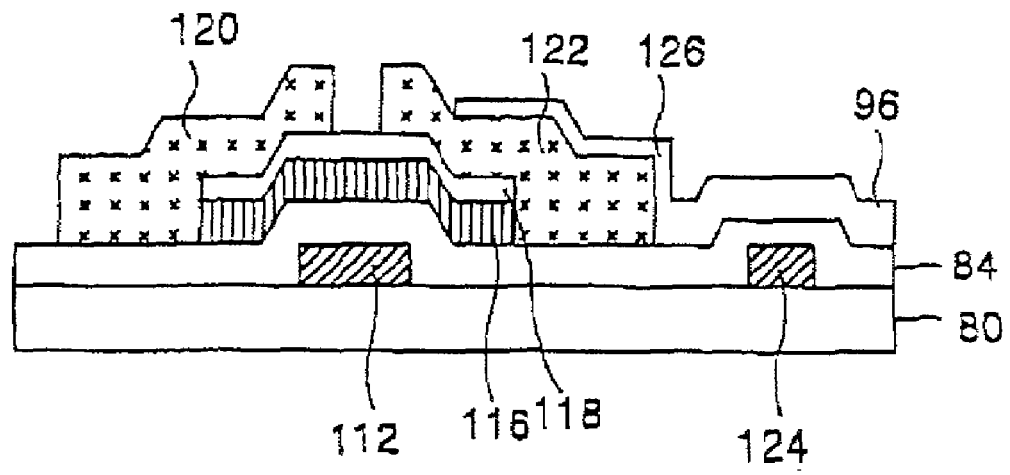

As shown in FIG. 14D, the pixel electrode 126 is formed by depositing a transparent conductive material such as ITO, IZO or ITZO, for example, onto the exposed portions of the gate insulating film 114 and the drain electrode 122.

Figure 14E:
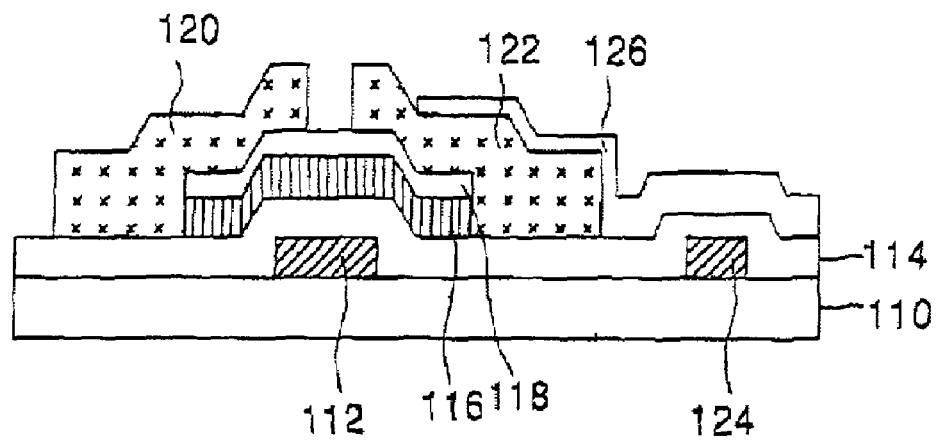

As shown in FIG. 14E, the exposed ohmic contact layer 118 is dry etched by using the source electrode 120 and the drain electrode 122 as a mask to thereby expose the active layer 116 through the ohmic contact layer 118, the source electrode 120 and the drain electrode 122.

Figure 14F:
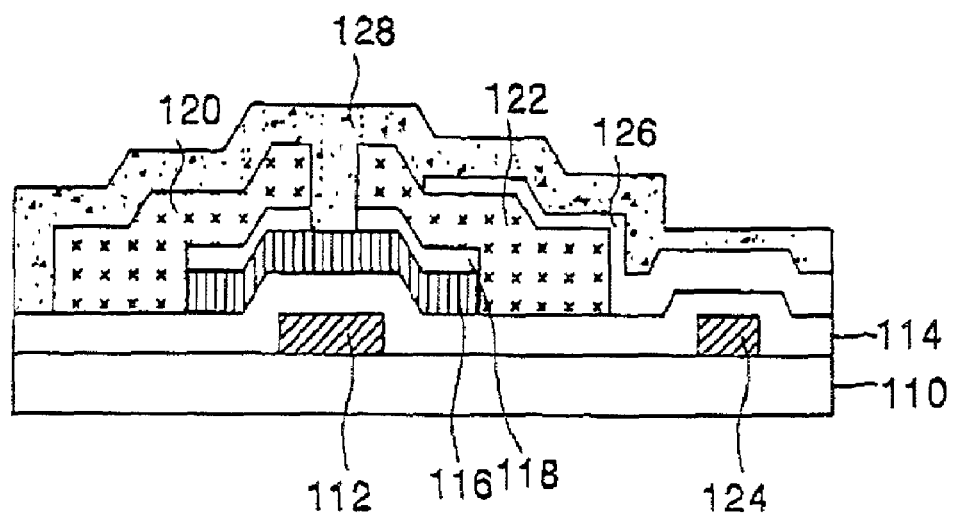

As shown in FIG. 14F, the alignment film 128 is deposited on the exposed surfaces of the substrate 110, the active layer 116, the ohmic contact layer 118, the source electrode 120, the drain electrode 122 and the pixel electrode 126. Prior to the formation of the alignment film 128, an annealing is carried out on all of the layers. Furthermore, the TFT is tested by applying an electrical signal to confirm that the TFT is functioning normally in its on and off states of operation.

If the test indicates that the TFT is functioning normally, then a primary alignment film of less than 1000 Å is coated by printing a polyimide resin serving as both the protective layer 48 and the alignment film 50 in the prior art using a roller and thereafter the normal alignment film 128 is formed by rubbing the surface of the primary alignment film. The polyimide resin may have a dielectric constant of about 3 and a thickness of about 500 to 700Å for example.

The step of forming a protective layer in the conventional five-mask LCD structure is omitted from the fabricating method of the present invention. The pixel electrode is patterned onto the source and drain electrodes and is then entirely deposited with a polyimide resin in the process of forming the substrate through the alignment, thereby having both functions of a protective layer and an alignment film. Accordingly, advantages of the present invention include the reduction in the number of masks as well as the process time and manufacturing costs of fabricating the liquid crystal display.

It will be apparent to those skilled in the art that various modifications and variations can be made in the liquid crystal display and fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device having liquid crystal cells arranged in a matrix type, comprising:
   a gate line for receiving a scanning signal;
   a data line for receiving a data signal;
   a pixel electrode provided at an intersection of the gate line and the data line to drive a liquid crystal cell;
   a thin film transistor for responding to the scanning signal to switch the data signal into the pixel electrode;
   a common line laterally adjacent to the pixel electrode along a direction of one of the gate and data lines; and
   an alignment film formed on at least a portion of the gate line, the data line and the pixel electrode to determine a primary alignment direction of a liquid crystal,
   wherein the pixel electrode and the common electrode are disposed directly on an insulating layer that serves as the gate insulating layer of the thin film transistor, and
   wherein the alignment film directly contacts upper and side surfaces of the common line, upper and side surfaces of the pixel electrode, and upper surfaces of the source and drain electrodes of the thin film transistor.

2. The liquid crystal display device as claimed in claim 1, wherein the alignment film is formed of a polyimide resin.

3. The liquid crystal display device as claimed in claim 2, wherein the polyimide resin has a dielectric constant of about 3 and a thickness of about 500 to 700 Å.

4. The liquid crystal display device as claimed in claim 1, wherein the pixel electrode is formed of a first material, and wherein the source and drain electrodes are formed of a second material different from the first material.

5. A liquid crystal display device having liquid crystal cells arranged in a matrix type, comprising:
   a gate line for receiving a scanning signal;
   a data line for receiving a data signal;
   a pixel electrode and a common electrode provided at a pixel area near an intersection of the gate line and the data line to drive a liquid crystal cell;
   a thin film transistor for responding to the scanning signal to switch the data signal into the pixel electrode;
   a common line laterally adjacent to the pixel electrode along a direction of one of the gate and data lines; and
   an alignment film entirely coated on a substrate to protect signal wires including the gate line, the data line, the pixel electrode and the common electrode and to determine a primary alignment direction of a liquid crystal,
   wherein the pixel electrode and the common electrode are disposed directly on an insulating layer that serves as the gate insulating layer of the thin film transistor, and
   wherein the alignment film directly contacts upper and side surfaces of the common line, upper and side surfaces of the pixel electrode, and upper surfaces of the source and drain electrodes of the thin film transistor.

6. The liquid crystal display device as claimed in claim 5, wherein the common electrode is formed of a transparent conductive material at the same layer as the pixel electrode in such a manner as not to overlap the pixel electrode.

7. The liquid crystal display device as claimed in claim 5, wherein the alignment film is formed of a polyimide resin.

8. The liquid crystal display device as claimed in claim 7, wherein the polyimide resin has a dielectric constant of about 3 and a thickness of about 500 to 700 Å.

9. The liquid crystal display device as claimed in claim 5, wherein the pixel electrode is formed of a first material, and wherein the source and drain electrodes are formed of a second material different from the first material.

* * * * *